(12) United States Patent
Oakes et al.

(10) Patent No.: US 7,180,419 B2
(45) Date of Patent: Feb. 20, 2007

(54) MERCHANDISE MARKING WITH PROGRAMMABLE TRANSPONDERS

(75) Inventors: Jonathan Oakes, Keene, NH (US); David Benjamin, Keene, NH (US)

(73) Assignee: Markem Corporation, Keene, NH (US)

( * ) Notice: Subject to any disclaimer, the term of this patent is extended or adjusted under 35 U.S.C. 154(b) by 112 days.

(21) Appl. No.: 10/843,028

(22) Filed: May 10, 2004

(65) Prior Publication Data

US 2005/0247399 A1 Nov. 10, 2005

(51) Int. Cl.
*G08B 13/14* (2006.01)
(52) U.S. Cl. ............... 340/572.1; 340/10.51; 156/238; 156/277; 53/415; 53/234
(58) Field of Classification Search ............. 340/572.1, 340/10.5, 572.4, 572.5; 156/238, 277, 272; 235/385; 53/415, 466, 135.3, 234
See application file for complete search history.

(56) References Cited

U.S. PATENT DOCUMENTS

| | | | |
|---|---|---|---|
| 6,028,518 A * | 2/2000 | Rankin et al. | ........... 340/572.1 |
| 6,246,326 B1 | 6/2001 | Wiklof et al. | |
| 6,409,401 B1 | 6/2002 | Petteruti et al. | |
| 6,529,799 B1 * | 3/2003 | Paulk et al. | ................ 700/227 |
| 6,593,853 B1 | 7/2003 | Barrett et al. | |
| 6,970,070 B2 * | 11/2005 | Juels et al. | ................ 340/10.1 |
| 2004/0195320 A1 * | 10/2004 | Ramsager | ................... 235/385 |
| 2005/0022470 A1 * | 2/2005 | Focke et al. | .................. 53/415 |

* cited by examiner

*Primary Examiner*—Anh V. La
(74) *Attorney, Agent, or Firm*—Fish & Richardson P.C.

(57) ABSTRACT

An apparatus for applying a programmable transponder to a target includes an applicator disposed adjacent to a tagging zone into which the target is conveyed and a feed-system for transporting a label to the applicator, each of the labels having a programmable transponder. A radiation source is disposed to illuminate a programming zone into which the label is transported. This radiation source communicates tag-information to the transponder. The communication of tag-information can occur either before or after the transponder is applied to the target.

22 Claims, 4 Drawing Sheets

MERCHANDISE MARKING WITH PROGRAMMABLE TRANSPONDERS

FIELD OF INVENTION

This invention relates to marking products, and in particular, to marking products using programmable transponders.

BACKGROUND

Current product marking schemes provide only limited information about the identity of a particular package of merchandise. As a result, it is difficult, using only information on the package, to trace mass market products to a particular source. It is even more difficult to trace the path taken by a package of merchandise through the supply chain from a manufacturer, through a chain of distributors, to a retailer.

Programmable transponders, such as RFID tags, have sufficient storage capacity to uniquely identify a package of merchandise. Such transponders offer the potential of marking mass-produced packages of merchandise with unique identifiers. The ease with which such transponders can be interrogated has the potential to render practical the task of tracking a package of merchandise through the supply chain.

For programmable transponders to realize this potential, they must first be affixed to the packages. To avoid introducing a bottleneck in the manufacturing process, they must be affixed to packages at line speeds. Although there exist devices for marking packages at line speeds, these devices tend to place identical markings on each package of merchandise. There is no requirement, in such marking devices, for marking merchandise units with information that changes from one unit to the next, and to do so while still maintaining line speed.

SUMMARY

The invention provides a method and apparatus for marking targets with uniquely identifying information by affixing programmable transponders to the targets.

In one aspect, the invention includes an apparatus for applying a programmable transponder to a target. The apparatus includes an applicator disposed adjacent to a tagging zone into which the target is conveyed, and a feed-system for transporting a label to the applicator. Each of the labels has a programmable transponder. A source of radiation is disposed to illuminate a programming zone into which the label is transported. This radiation source communicates tag-information to the transponder as it passes through the programming zone.

Embodiments of the invention include those in which a printer is disposed adjacent to a printing zone into which the target is conveyed. The printer is configured to print visible-information on the target, the visible-information corresponding to at least a portion of the tag-information.

In those embodiments having a printer, the printing zone can be distinct from the tagging zone, or it can at least partially overlap the tagging zone.

In some embodiments, the transponder receives tag information only after it has been applied to a target. Examples of such embodiments include those having a conveyor belt defining a downstream direction. The conveyor belt is disposed to convey the target to the tagging zone, where the label is applied to the target, and to then convey the target from the tagging zone to the programming zone.

In other embodiments, the tagging zone and the programming zone are spatially separated from each other.

In yet other embodiments, the source is disposed to illuminate the label after the label has been applied to the target.

Additional embodiments include those in which a conveyor belt is configured to transport the label through the programming zone.

The invention also includes an apparatus in which the tag is programmed before it is applied to the target. In some such embodiments, the feed-system is configured to transport the label through the programming zone.

To avoid interference resulting from the proximity of labels to each other, there exist embodiments in which a Faraday cage encloses the source. In such embodiments, the feed-system is configured to pass the label through the Faraday cage.

In another aspect, the invention includes a method for applying a programmable transponder to a target by transporting a label having the transponder to an applicator disposed adjacent to a tagging zone into which the target is conveyed and transporting the label to a programming zone. When the transponder is in the programming zone, tag-information is communicated to the transponder. When the target is in the tagging zone, the label is affixed to the target.

Some practices of the invention include the additional step of imprinting visible information on the target, the visible information being consistent with the tag information.

In some practices of the invention, the step of affixing the label to the target is performed prior to the step of transporting the label to the programming zone. In other practices, the order is reversed, so that the step of affixing the label to the target is performed after the step of transporting the label to the programming zone.

In one practice of the invention, the target is transported to the programming zone with the transponder already affixed to the target. In another practice, the label is attached to a strip of labels and the strip is passed through the programming zone.

In another aspect, the invention includes an apparatus for automatically applying RFID tags to units of merchandise. The apparatus includes a label-supply for supplying the RFID tags; a conveyor belt for transporting the unit through a tagging zone; an applicator for applying an RFID tag to a unit of merchandise when the unit is within the tagging zone; a feed-system for providing RFID tags to the applicator; and a transponder-interface for communicating tag information to the RFID tag when the RFID tag is in a programming zone.

These and other features of the invention will be apparent from the following detailed description, and the accompanying figures, in which:

DETAILED DESCRIPTION

The present invention provides a marking apparatus for automatically applying programmable transponders onto a target. The target is typically a unit of merchandise, such as a box containing individual units to be sold at retail, the retail packages themselves, or any other item that would be marked with either a label or by imprinting information directly thereon.

The programmable transponder is intended to encode information (referred to herein as "tag-information") about the target to which it is attached.

The programmable transponder is intended to encode information (referred to herein as "tag-information") about the target to which it is attaches. However, the programmable transponders do not come with tag-information already encoded. As a result, it is necessary to encode tag-information on the transponder and to read back that tag-information to confirm proper operation of the programmable tag. These processes shall be collectively referred to as "programming" the transponder. This extra requirement of programming a transponder is not present in a conventional marking apparatus.

In one embodiment, described in connection with FIG. 1, the transponder is programmed after having been applied to the target. In other embodiments, described in connection with FIGS. 2 and 3, the transponder is programmed before it is applied to the target. In either of these embodiments, an optional printer can be included to imprint a bar code, or human-readable identifying information, that is consistent with the tag-information. Such information is collectively referred to herein as "visible" information.

Figure 4:
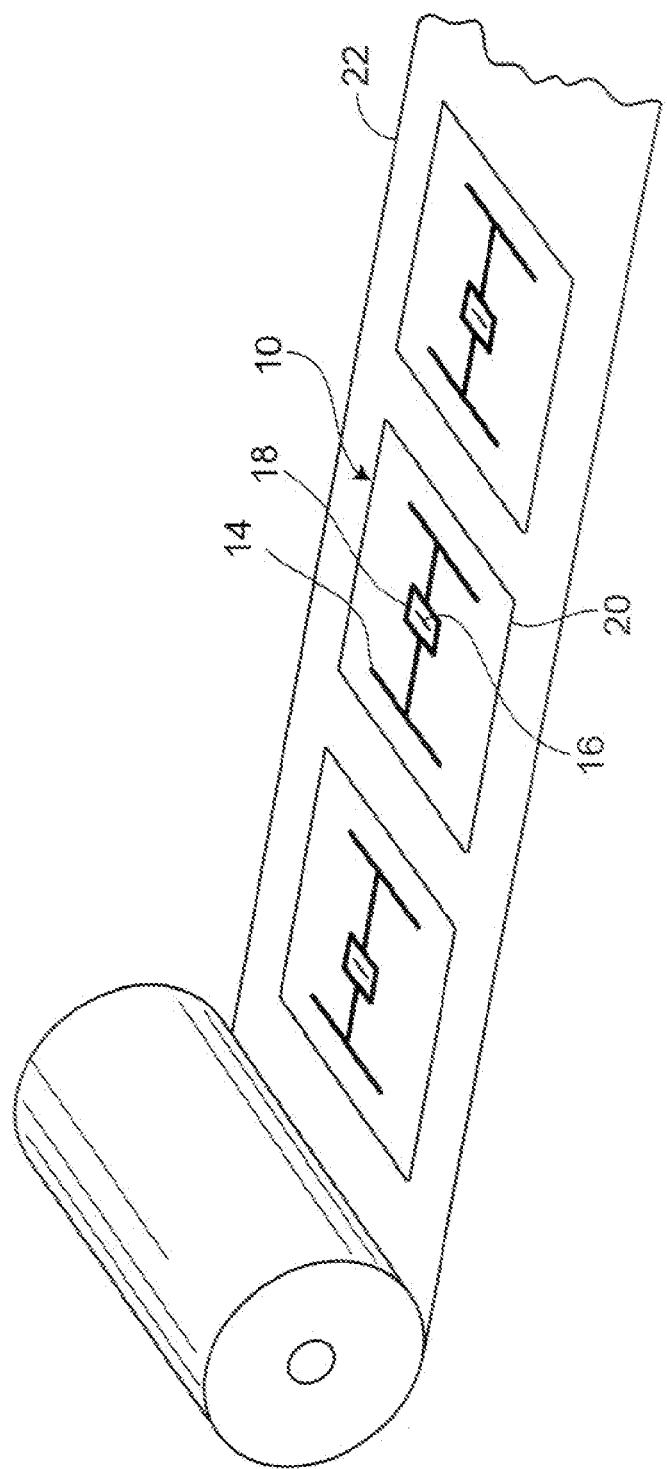
FIG. 4 shows a label having an RFID tag.

In the embodiments described herein, the programmable transponder is a radio frequency identification ("RFID") tag on a label that, together with many other labels, is affixed to a flexible strip. Referring to FIG. 4, an exemplary label 10 includes an RFID tag having a tag-antenna 14 in electrical communication with a transponder 16 integrated into a semiconductor chip 18. The label 10 has an adhesive side 20 that adheres to a flexible strip 22. This adhesive side 20 is also intended to adhere to a target.

Referring back to FIG. 1, a first embodiment of the marking apparatus 24 features a conveyor-belt 26 driven by a conveyor-motor (not shown) in a downstream direction 28. At an upstream end of the conveyor-belt 26, a feed-system 30 driven by a feed-motor (not shown) guides a strip 22 of labels 10 from a label-holder 32 to an applicator 34.

The applicator 34 includes walls defining a cavity in fluid communication with a blower-motor (not shown). One wall of the applicator 34 is a grill 36 that defines a tagging zone at a front side thereof and into which the conveyor-belt 26 conveys a target 38. The blower-motor is configured to generate a negative pressure to draw air through the grill 36 and into the cavity. Inside the cavity are a plurality of air jets (not shown) oriented to direct compressed air through the grill 36, toward the tagging zone. An applicator 34 of this type is that sold under the trade name CIMJET 331 by Markem Corporation of Keene, N.H.

The feed-system 30 peels the label 10 from the strip 22 so that the adhesive side 20 of the label 10 faces away from the grill 36, and passes the peeled label 10 to the applicator 34. A feed-system 30 adaptable for guiding a strip 22 of labels toward the applicator 34 is the CIMJET 300, which is manufactured and sold by Markem Corporation of Keene, New Hampshire.

The conveyor-motor, the feed-motor, the blower-motor, and the air jets are all controlled by a processor 40. In operation, the processor 40 causes the conveyor-motor to drive the conveyor-belt 26. Meanwhile, the processor 40 causes the feed-motor to drive the feed-system 30 until a peeled label 10 is passed to the applicator 34. The negative pressure applied by the blower-motor then holds the label 10 against the grill 36 until such time as the conveyor-belt 26 brings a target 38 into the tagging zone.

Upon detection of a target 38 approaching the tagging zone, a first edge-detector 42, positioned upstream of the applicator 34, sends a trigger signal to the processor 40. After a brief delay, to allow the conveyor-belt 26 to center the target 38 in the tagging zone, the processor 40 causes the air jets to provide a sudden burst of positive pressure. This blows the label 10 toward the target 38 so that the adhesive side 20 of the label 10 sticks to the target 38.

Downstream from the applicator 34 is a transponder-interface 44 in data communication with the processor 40. The transponder-interface 44 is in electrical communication with an antenna 46 having a field-of-view oriented to define a programming zone into which the conveyor-belt 26 conveys the target 38. In this embodiment, the conveyor-belt 26 conveys the target 38 into the programming zone after the target 38 has already been through the tagging zone. As a result, the transponder 16 is affixed to the target 38 before being programmed.

A second edge-detector 48, also in communication with the processor 40, detects entry of a target 38 into the programming zone. Upon detecting such entry, the second edge-detector 48 provides a trigger signal to the processor 40. After a brief delay, to allow the conveyor-belt 26 to center the target 38 within the programming zone, the processor 40 causes the transponder-interface 44 to generate an encoding signal to be received by the transponder 16.

The encoding signal has the effect of encoding tag-information in the transponder 16. The tag-information can include a serial number that uniquely identifies the target 38. However, the subject matter of the invention does not depend on the particular nature of the tag-information.

Before the conveyor-belt 26 can finish conveying the target 38 through the programming zone, the processor 40 causes the transponder-interface 44 to generate an interrogation signal requesting the transponder 16 to identify itself. A transponder 16 that operates correctly will then radiate a response signal containing the tag-information encoded therein. The antenna 46 receives this response signal and provides it to the transponder-interface 44. The transponder-interface 44 then confirms that the transponder 16 is operating correctly and provides this information to the processor 40.

In some cases, either there is no response signal or the response signal contains erroneous tag-information. In this case, the processor 40 can take several courses of action. It can, for example, stop the conveyor-belt 26 and sound an alarm requesting intervention by an attendant. Or, the processor 40 can actuate an optional arm that pushes the target 38 off the conveyor-belt 26.

In some cases, depending on the nature of the target 38, the manufacturer may be willing to accept a certain number of defective transponders 16. In such cases, the processor 40 maintains statistics on the number and frequency of defective transponders 16. The processor 40 may then be configured to do nothing until either a threshold number of defective transponder is reached, or until the occurrence of defective transpondes 16 becomes too frequent. If either of these events occur, the processor 40 can be configured to request intervention by an attendant, or to cause an optional arm to push targets having defective transponders 16 off the conveyor-belt 26.

Figure 1:
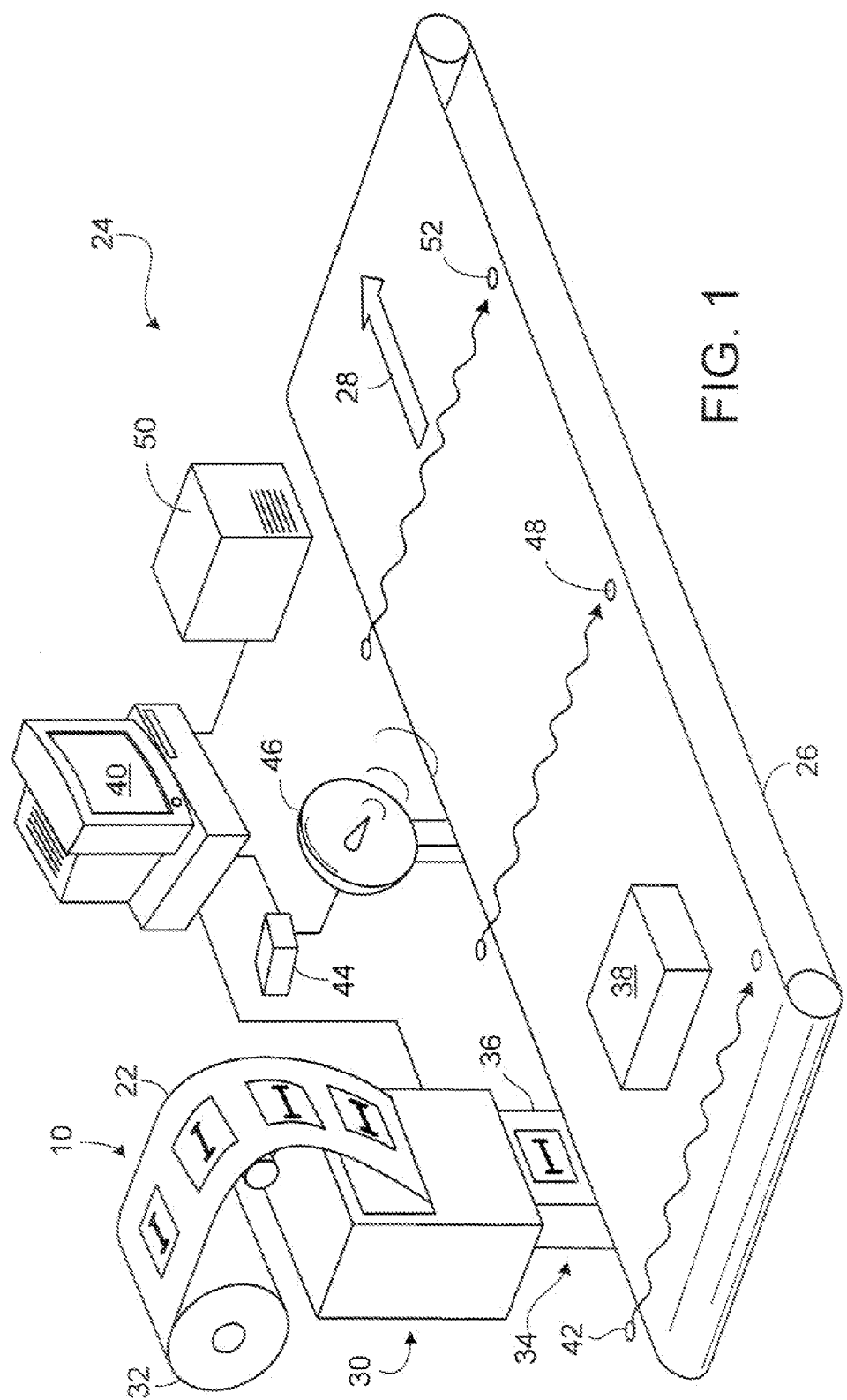
FIG. 1 shows a marking apparatus in which a transponder is programmed after it is affixed to a target.

FIG. 1 also shows an optional printer 50 controlled by the processor 40. The printer 50 has a printing zone through which the conveyor-belt 26 passes the target 38. A third edge-detector 52 sends a trigger signal to the processor 40 to indicate entry of the target 38 into the printing zone.

As shown in FIG. 1, the conveyor-belt 26 passes the target 38 through the printing zone after the target 38 has already passed through the programming zone. However, in other embodiments, the printing zone is upstream from the programming zone or even upstream from the tagging zone.

In a marking apparatus 24 having a printer 50, the processor 40 causes the printer 50 to mark the target 38 with visible-information that corresponds, at least in part, to the tag-information. The printer 50 need not mark the target 38 directly. Instead, the printer 50 can mark the target 38 by printing visible-information on a label and applying that label to the target 38 in a conventional manner. If a target 38 is labeled with a defective transponder 16, the printer 50 can mark the target 38 with visible-information indicating that the transponder 16 is defective. Examples of label applicators 34 that can be incorporated into the marking apparatus 24 include any of the CIMJET labeling machines sold by Markem Corporation, of Keene, N.H.

In some cases, it may not be desirable to apply the label 10 to the target 38 until the transponder 16 has been programmed. This will allow the operation of the transponder 16 to be verified before the label 10 containing the transponder 16 is affixed to the target 38. An additional embodiment of the marking apparatus 24, shown in FIG. 2, achieves this by having the feed-system 30 guide the strip 22 of labels through the programming zone of the antenna 46. In this embodiment, a label 10 on the strip 22 passes through the programming zone on its way from the label-holder 32 to the applicator 34.

Figure 2:
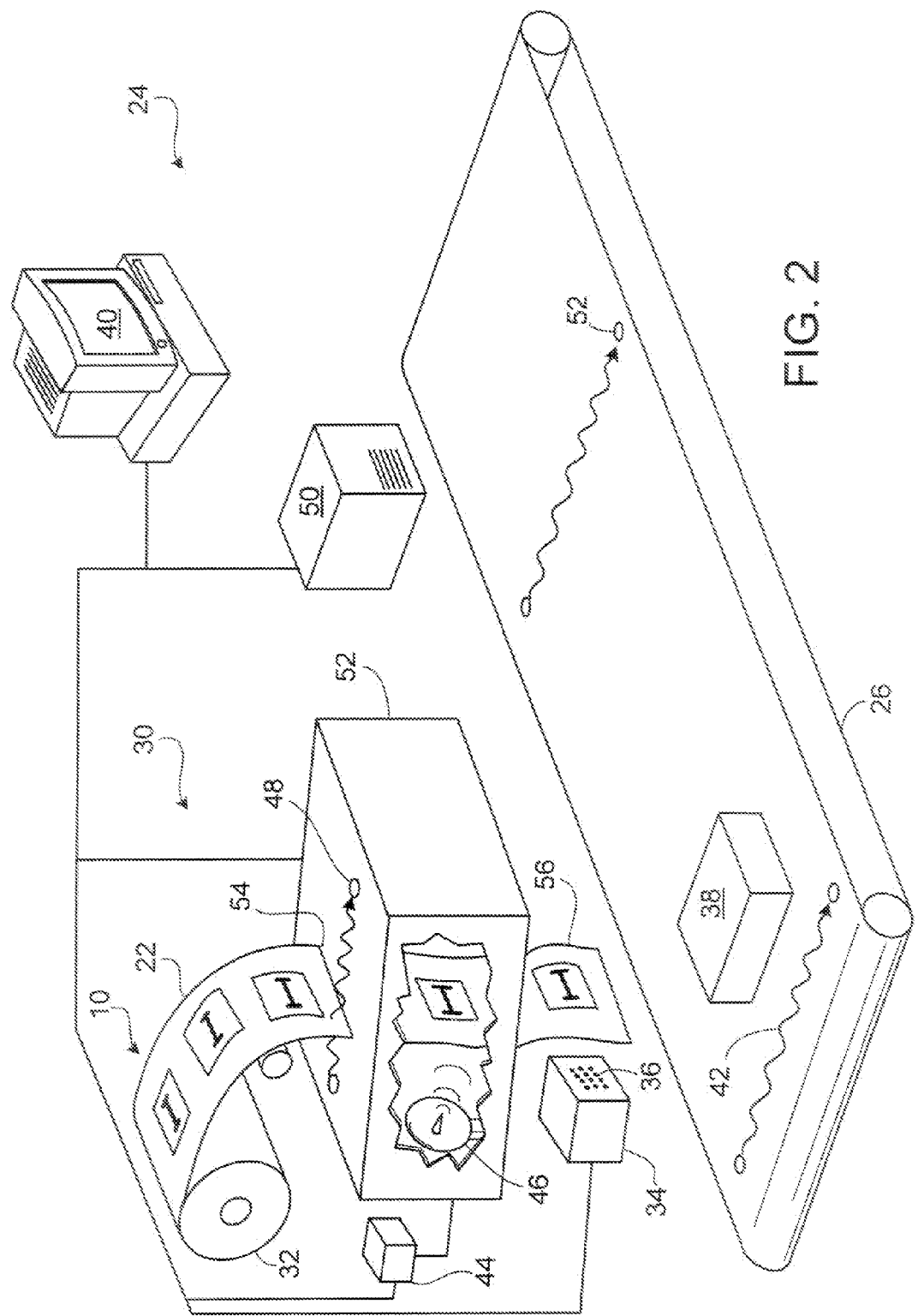
FIG. 2 shows a marking apparatus in which the transponder is programmed before it is affixed to the target.

In the embodiment of FIG. 2, a second edge-detector 48, also in communication with the processor 40, detects entry of a label 10 into the programming zone. Upon detecting such entry, the second edge-detector 48 provides a trigger signal to the processor 40. After a brief delay, to allow the transponder 16 to be centered within the programming zone, the processor 40 causes the antenna 46 to radiate an encoding signal and an interrogating signal to the transponder 16, as discussed in connection with FIG. 1.

If the transponder 16 fails to respond, or if it responds with erroneous tag-information, the processor 40 can cause the conveyor-belt 26 to move the target 38 away from the tagging zone so that when the defective label 10 reaches the grill 36, the applicator 34 can blow the defective label 10 across the conveyor-belt 26, thereby preventing it from being affixed to any target 38.

To avoid having defective labels scattered on the floor nearby, the feed system 30 can include a selective peeling bar to peel the label 10 off the strip 22. A selective peel bar suitable for incorporation into the feed system 30 is described in a co-owned and concurrently filed patent application entitled "Peel Bar for Selective Label Application," the contents of which are herein incorporated by reference.

Because the labels 10 lie close to each other on the strip 22, the programming zone may encompass more than one label 10. When this is the case, the encoding signal may affect more than one transponder 16. To avoid this, the illustrated embodiment features an antenna 46 enclosed by a Faraday cage 52 having an entrance aperture 54 and an exit aperture 56. Because the Faraday cage 52 confines electromagnetic radiation within it, the programming zone is restricted to the interior of the cage 52.

The strip 22 is threaded such that it passes through the entrance aperture 54, into the Faraday cage 52, and out the exit aperture 56. The feed-motor drives the strip 22 at a rate such that encoding and interrogation can occur while the label 10 is inside the Faraday cage 52. The distance between the entrance aperture 54 and exit aperture 56 is selected such that when a label 10 is completely inside the cage 52, its neighboring labels are outside the cage 52. This ensures that when a particular transponder 16 is programmed, the neighboring transponders remain unaffected.

As noted above, by having the same processor 40 control both the printer 50 and the transponder-interface 44, the visible-information on a target 38 can easily be made consistent with the tag-information. However, when the printing zone and the programming zone are separated from each other, the marking apparatus 24 can mistakenly label the target 38 with visible-information that is inconsistent with the tag-information. This may occur, for example, if a target 38 falls off the conveyor-belt 26, or if a target 38 that has fallen off the conveyor-belt 26 is inadvertently replaced out of sequence.

Figure 3:
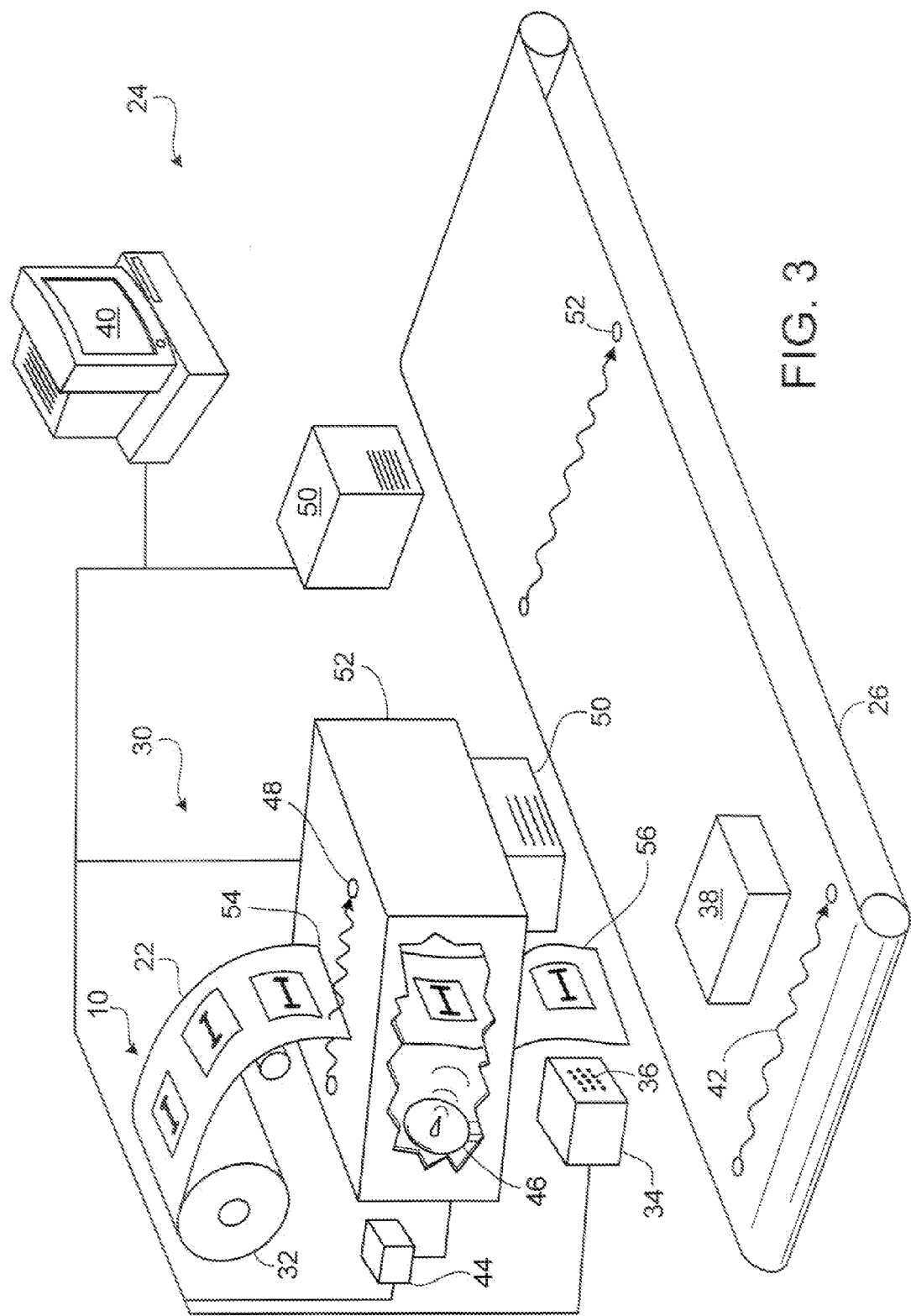
FIG. 3 shows a marking apparatus in which the printing zone overlaps the application zone.

To avoid inconsistency between the visible-information and the tag-information, another embodiment of the marking apparatus 24 features a printer 50 disposed such that the printing zone and the tagging zone at least partially overlap, as shown in FIG. 3. In this case, only the first edge-detector 42 is necessary. A marking apparatus 24 such as that shown in FIG. 3, in which application of the label 10 and the printing of visible-information occur without having to move the target 38, reduces the likelihood of an inconsistency between the tag-information and the visible-information.

While the embodiments described herein encode tag-information in an RFID tag, the invention does not depend on the particular type of transponder 16 that is attached to the label 10. In fact, the scope of the invention is circumscribed only by the appended claims.

The invention claimed is:

1. An apparatus for applying a programmable transponder to a target, said apparatus comprising:
   an applicator disposed adjacent to a tagging zone into which said target is conveyed;
   a feed-system for transporting a label to said applicator, each of said labels having a programmable transponder; and
   a source of radiation for communicating and providing tag-information to said transponder, said source being disposed to illuminate a programming zone into which said label is transported.

2. The apparatus of claim 1, further comprising a transponder-interface in communication with said source for causing said source to provide said tag information to said transponder.

3. The apparatus of claim 1, further comprising a conveyor belt disposed to convey said target through said tagging zone.

4. The apparatus of claim 1, wherein said transponder comprises an RFID tag.

5. The apparatus of claim 1, wherein said radiation source comprises an antenna.

6. The apparatus of claim 2, further comprising a printer disposed adjacent to a printing zone into which said target is conveyed, said printer being configured to print visible-information on said target, said visible-information corresponding to at least a portion of said tag-information.

7. The apparatus of claim 1, further comprising a conveyor belt having a downstream direction, said conveyor belt being disposed:
to convey said target to said tagging zone, where said label is applied to said target; and
to convey said target from said tagging zone to said programming zone.

8. The apparatus of claim 1, wherein said tagging zone and said programming zone are spatially separated from each other.

9. The apparatus of claim 1, wherein said source is disposed to illuminate said label after said label has been applied to said target.

10. The apparatus of claim 1, further comprising a conveyor belt configured to transport said label through said programming zone.

11. The apparatus of claim 1, wherein said feed-system is configured to transport said label through said programming zone.

12. The apparatus of claim 1, further comprising a Faraday cage enclosing said source, and wherein said feed-system is configured to pass said label through said Faraday cage.

13. The apparatus of claim 1, further comprising a printer having a print zone into which said target is transported, said print zone having a portion that overlaps said tagging zone.

14. A method for applying a programmable transponder to a target, the method comprising:
transporting a label to an applicator disposed adjacent to a tagging zone into which said target is conveyed, said label having a programmable transponder;
transporting said label to a programming zone;
communicating and providing tag-information to said transponder when said transponder is in said programming zone; and
affixing said label to said target when said target in said tagging zone.

15. The method of claim 14, wherein transporting said label to a programming zone comprises transporting said target to said programming zone, said label being affixed to said target.

16. The method of claim 14, wherein the step of affixing said label to said target is performed prior to said step of transporting said label to said programming zone.

17. The method of claim 14, wherein transporting said label to said programming zone comprises transporting a strip of labels through said programming zone, said label being affixed to said strip.

18. The method of claim 14, wherein said step of transporting said label to said programming zone is performed prior to said step of affixing said label to said target.

19. The method of claim 14, further comprising marking said target with visible information, said visible information being consistent with said tag information.

20. An apparatus for automatically applying RFID tags to units of merchandise, said apparatus comprising:
a label-supply for supplying said RFID tags;
a conveyor belt for transporting said units through a tagging zone;
an applicator for applying an RFID tag to a unit of merchandise when said unit is within said tagging zone;
a feed-system for providing RFID tags to said applicator; and
a transponder-interface for communicating and providing tag information to said RFID tag when said RFID tag is in a programming zone.

21. The apparatus of claim 20, wherein said conveyor belt is disposed to transport said unit through said programming zone.

22. The apparatus of claim 20, wherein said feed-system is configured to transport said RFID tag through said programming zone.

* * * * *